(12) United States Patent
Kaneda

(10) Patent No.: US 10,665,093 B2
(45) Date of Patent: May 26, 2020

(54) REMOTE DEVICE AND REMOTE DEVICE SYSTEM

(71) Applicant: SONY CORPORATION, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 139 days.

(21) Appl. No.: 15/751,214

(22) PCT Filed: Jul. 8, 2016

(86) PCT No.: PCT/JP2016/070229
§ 371 (c)(1),
(2) Date: Feb. 8, 2018

(87) PCT Pub. No.: WO2017/038253
PCT Pub. Date: Mar. 9, 2017

(65) Prior Publication Data
US 2018/0233031 A1    Aug. 16, 2018

(30) Foreign Application Priority Data

Sep. 1, 2015    (JP) ................ 2015-172265

(51) Int. Cl.
*G08C 23/06* (2006.01)
*H04N 5/00* (2011.01)
(Continued)

(52) U.S. Cl.
CPC ............. *G08C 23/06* (2013.01); *G02B 6/102* (2013.01); *G02B 6/1228* (2013.01); *G08C 23/04* (2013.01);
(Continued)

(58) Field of Classification Search
CPC ........ G08C 23/06; G08C 23/04; G02B 6/102; G02B 6/1228; H04N 5/4403; H04N 5/00;
(Continued)

(56) References Cited

U.S. PATENT DOCUMENTS 7,495,204 B2 *  2/2009  Zhang .................... G08C 23/04
                                              250/214 AL
2009/0250598 A1 * 10/2009 Hamada .................... G01J 1/02
                                              250/227.11

FOREIGN PATENT DOCUMENTS

| JP | 05-122774 A | 2/1993 |
| JP | 05-122774 A | 3/1993 |
| JP | 05-122774 A | 5/1993 |
| JP | 05-347591 A | 12/1993 |

(Continued)

OTHER PUBLICATIONS

International Search Report and Written Opinion of PCT Application No. PCT/JP2016/070229, dated Sep. 13, 2016, 10 pages.
(Continued)

*Primary Examiner* — Christine S. Kim
(74) *Attorney, Agent, or Firm* — Chip Law Group

(57) ABSTRACT

A remote device of the disclosure includes: an exterior having a plurality of holes through which light passes, and having a structure in which a surrounding part of the holes blocks the light; a light receiver that is disposed inside the exterior, and receives signal light of one or more optical remote controls; and a light guiding section that is provided between the light receiver and a front surface of the exterior, and guides, to the light receiver, the signal light that has entered a predetermined region of the exterior. The predetermined region includes two or more of the holes.

16 Claims, 17 Drawing Sheets

(51) Int. Cl.
*H04Q 9/00* (2006.01)
*G02B 6/10* (2006.01)
*G02B 6/122* (2006.01)
*G08C 23/04* (2006.01)
*H04N 5/44* (2011.01)

(52) U.S. Cl.
CPC ............. *H04N 5/00* (2013.01); *H04N 5/4403* (2013.01); *H04Q 9/00* (2013.01)

(58) Field of Classification Search
CPC .... H04Q 9/00; H04Q 2209/40; H04B 10/114; H04B 10/67
See application file for complete search history.

(56) References Cited

FOREIGN PATENT DOCUMENTS

| | | |
|---|---|---|
| JP | 06-013242 U | 2/1994 |
| JP | 06-289260 A | 10/1994 |
| JP | 06-289260 A | 10/1994 |
| JP | 07-087424 A | 3/1995 |
| JP | 2004-320304 A | 11/2004 |
| JP | 2005-347858 A | 12/2005 |
| JP | 2007-294992 A | 11/2007 |

OTHER PUBLICATIONS

Office Action for JP Patent Application No. 2017-537628, dated Mar. 17, 2020, 05 pages of Office Action and 04 pages of English Translation.

\* cited by examiner

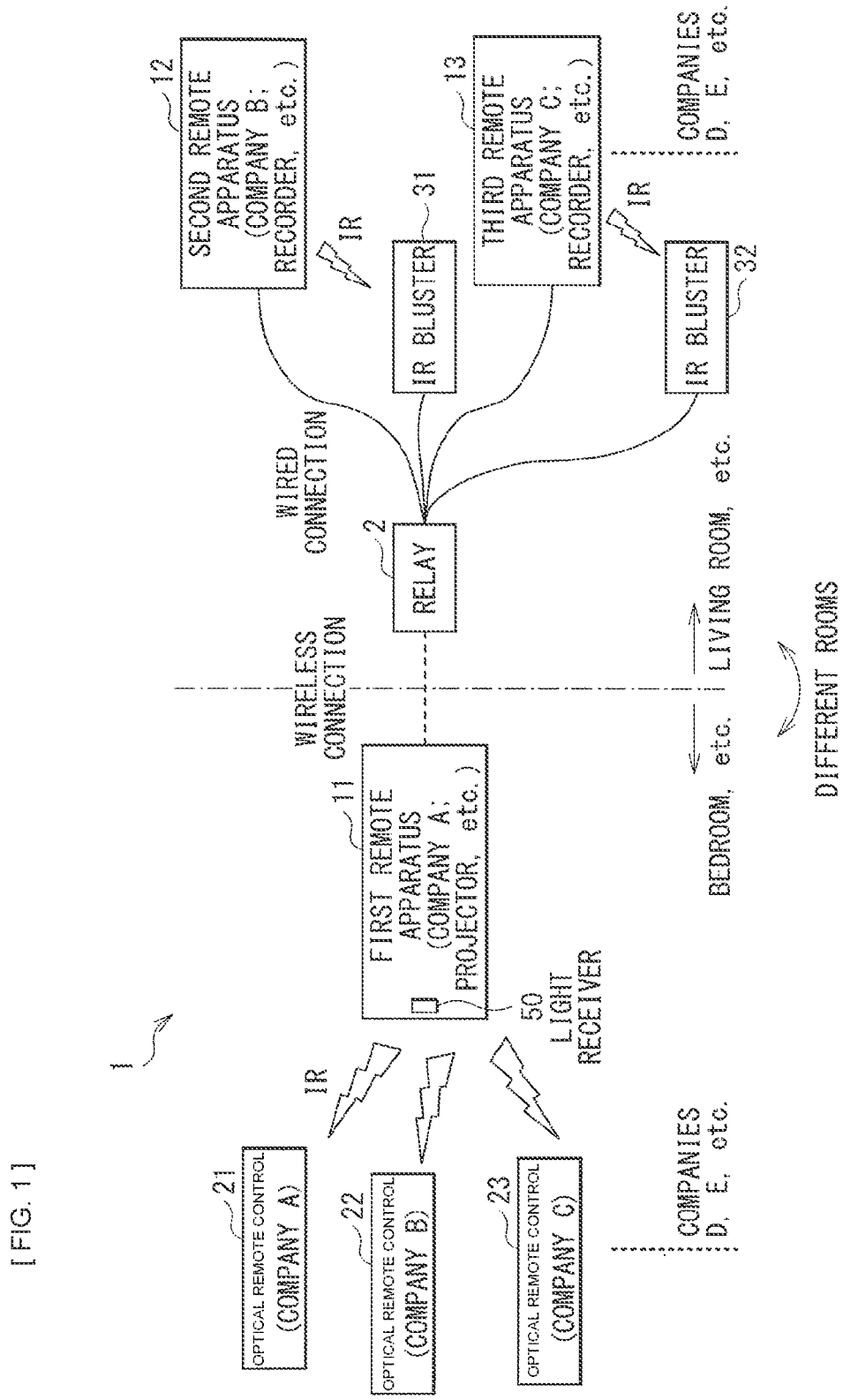
[FIG. 1]

[ FIG. 2 ]
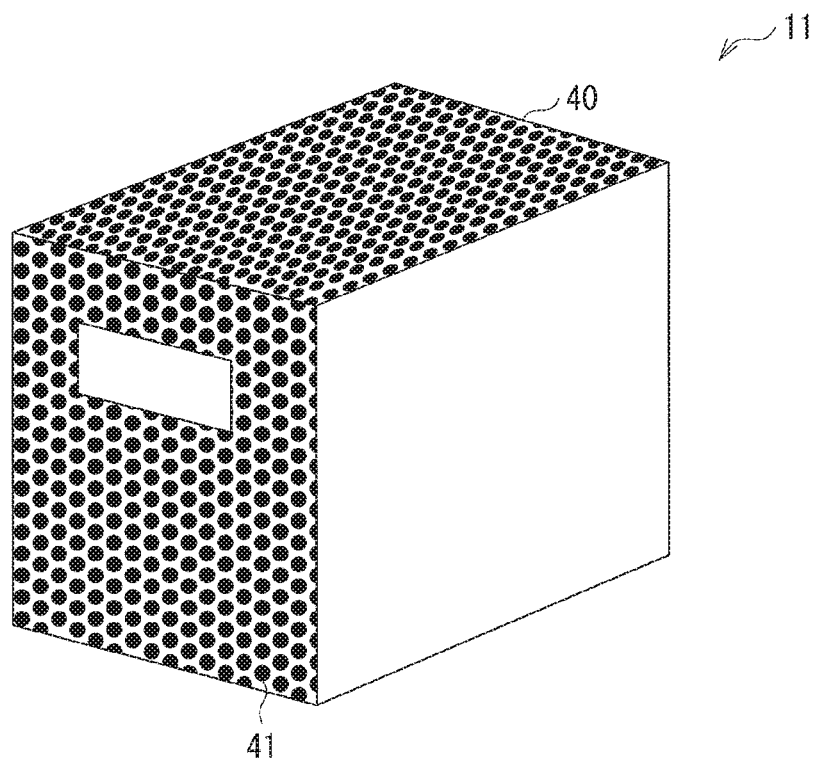
[ FIG. 3 ]
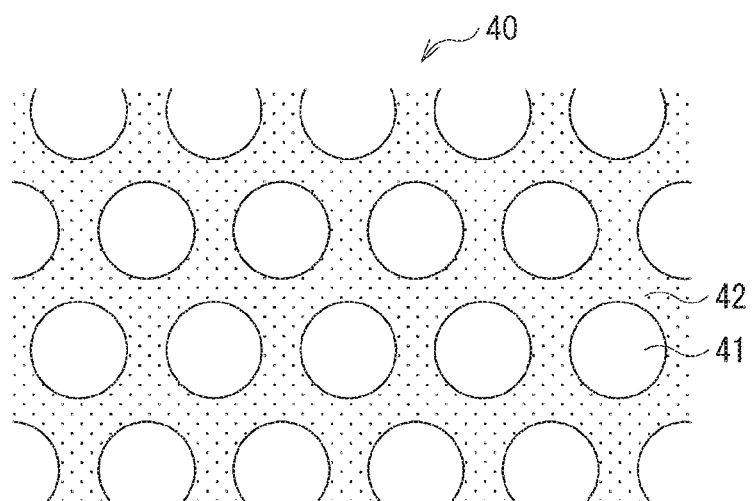

[ FIG. 4 ]
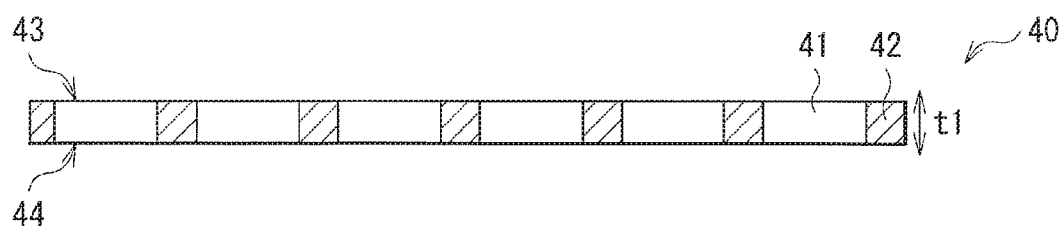
[ FIG. 5 ]
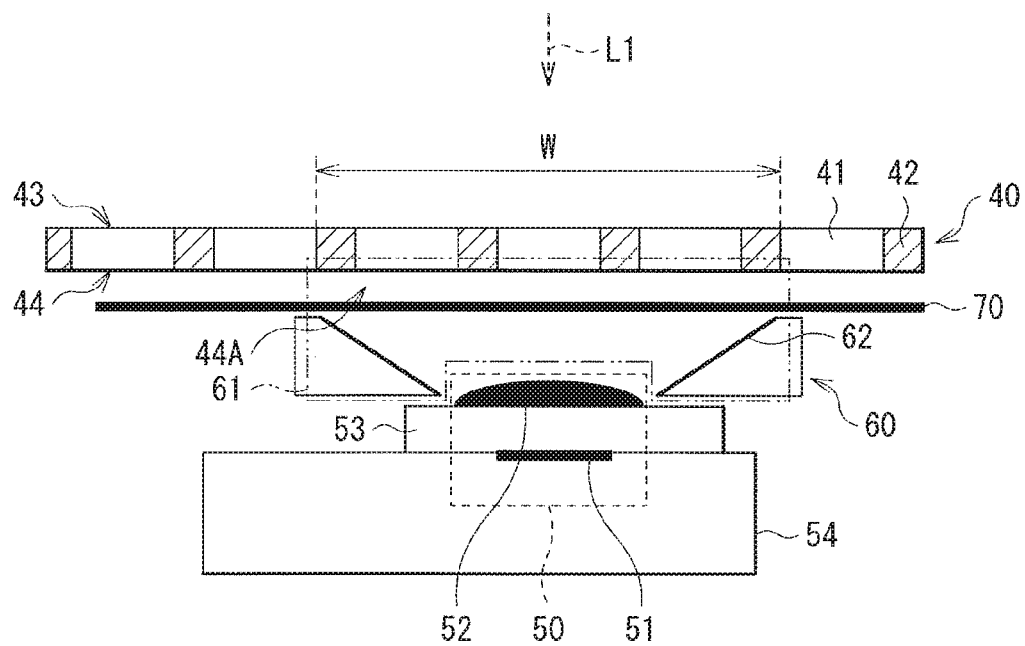

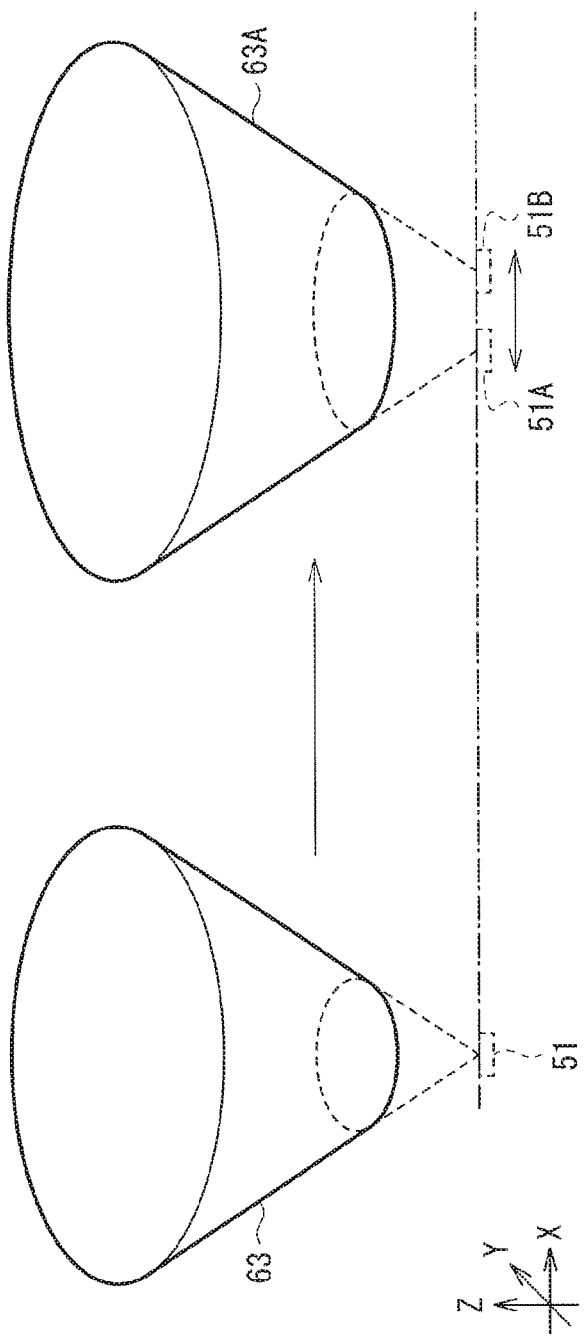

[ FIG. 7 ]
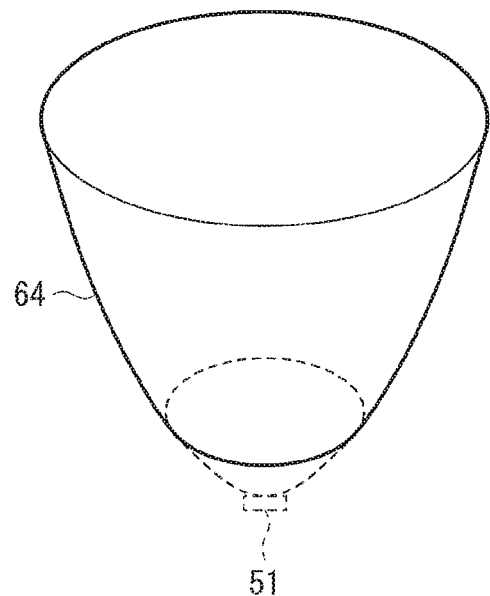
[ FIG. 8 ]
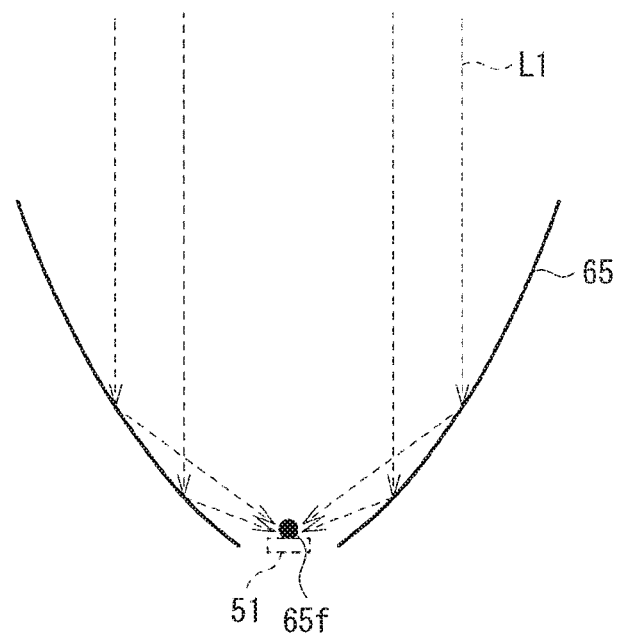

[ FIG. 9 ]
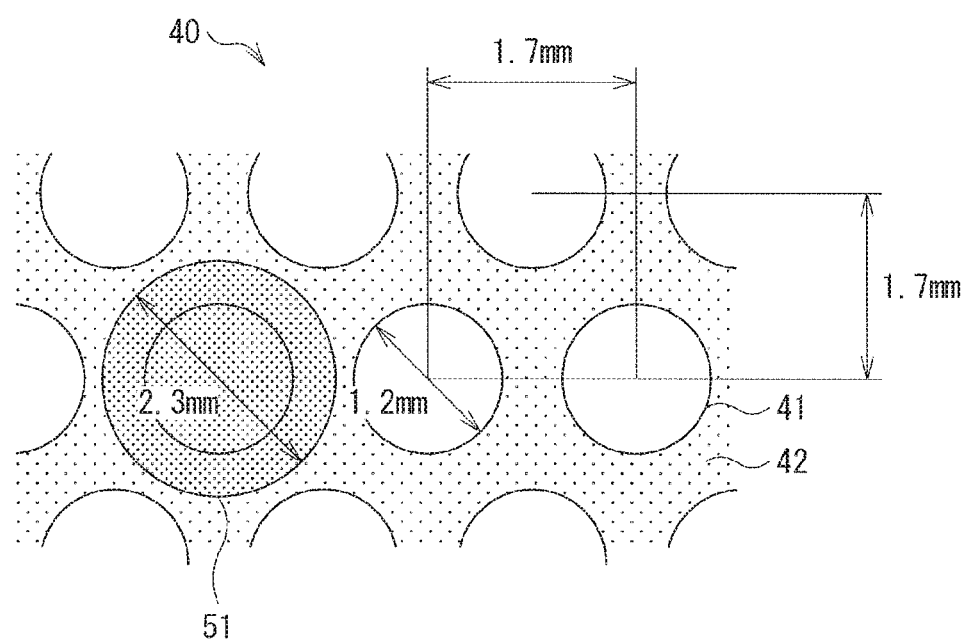

[ FIG. 10 ]

| 0deg | MESH ABSENT | MESH PRESENT | MESH PRESENT |
|---|---|---|---|
|  | — | — | REFLECTING STRUCTURE PRESENT |
| NORMALIZED AMOUNT OF LIGHT RECEIVED | 1 | 0.27 | 0.67 |
| DETECTABLE DISTANCE (m) | 11 | 5.7 | 9.0 |

[ FIG. 11 ]

| 30deg | MESH ABSENT | MESH PRESENT | MESH PRESENT |
|---|---|---|---|
|  | — | — | REFLECTING STRUCTURE PRESENT |
| NORMALIZED AMOUNT OF LIGHT RECEIVED | 0.9 | 0.17 | 0.55 |
| DETECTABLE DISTANCE (m) | 10.4 | 4.5 | 8.2 |

[ FIG. 12 ]

| 60deg | MESH ABSENT | MESH PRESENT | MESH PRESENT |
|---|---|---|---|
|  | — | — | REFLECTING STRUCTURE PRESENT |
| NORMALIZED AMOUNT OF LIGHT RECEIVED | 0.8 | 0.08 | 0.1 |
| DETECTABLE DISTANCE (m) | 9.8 | 3.1 | 3.5 |

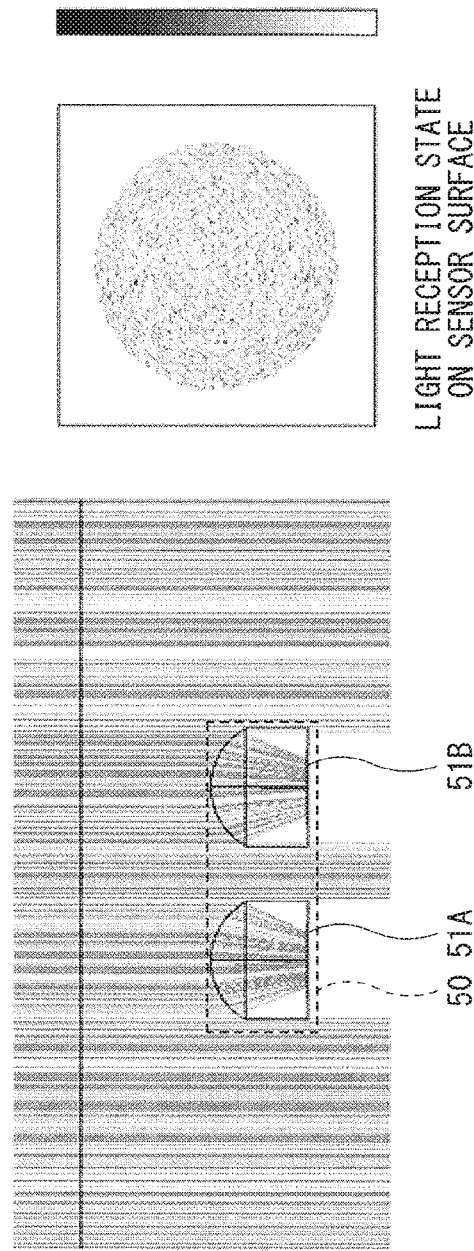
[FIG. 13]

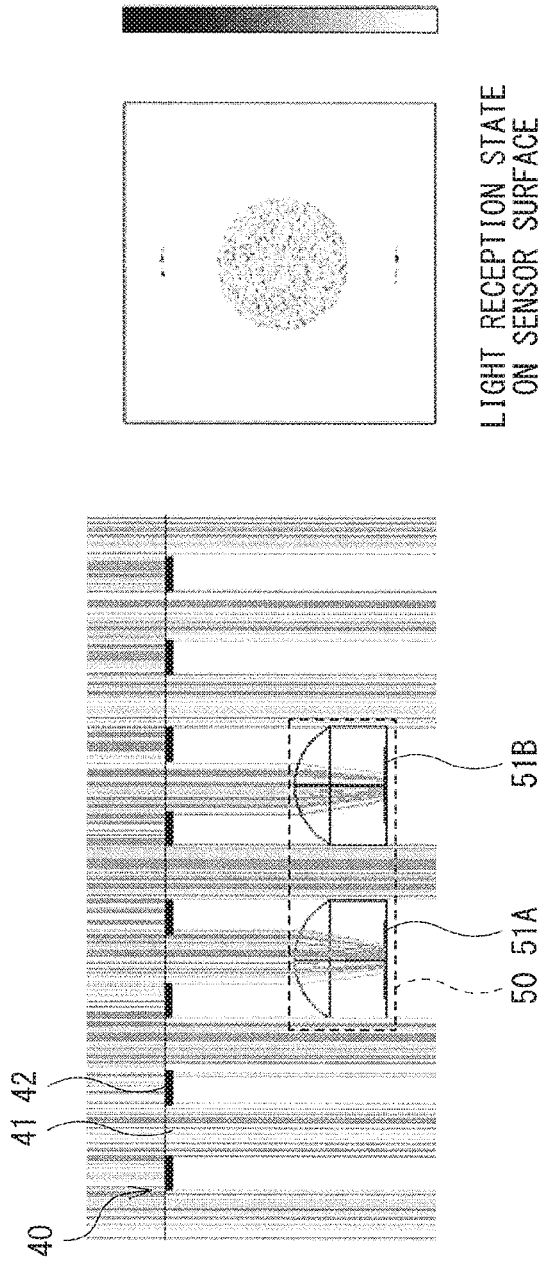
[FIG. 14]

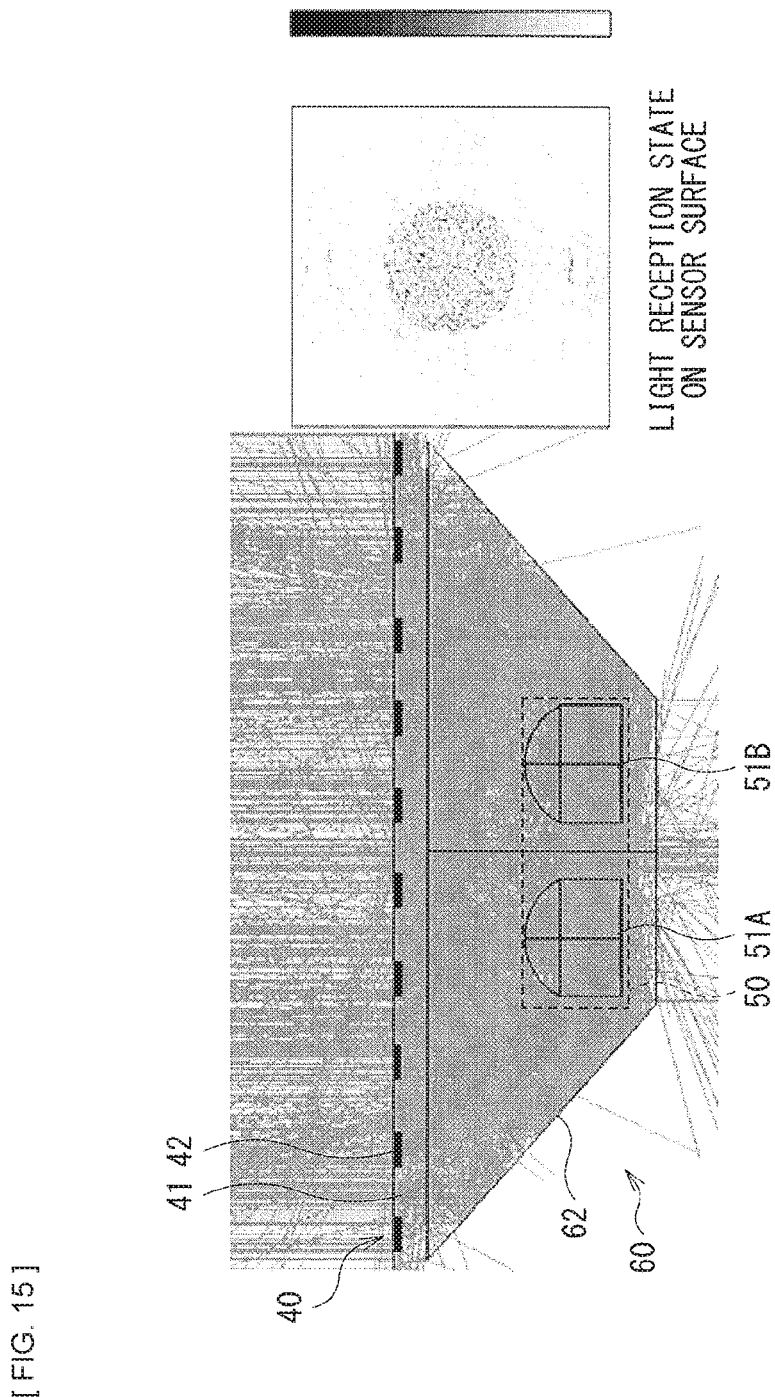
[FIG. 15]

[ FIG. 16 ]
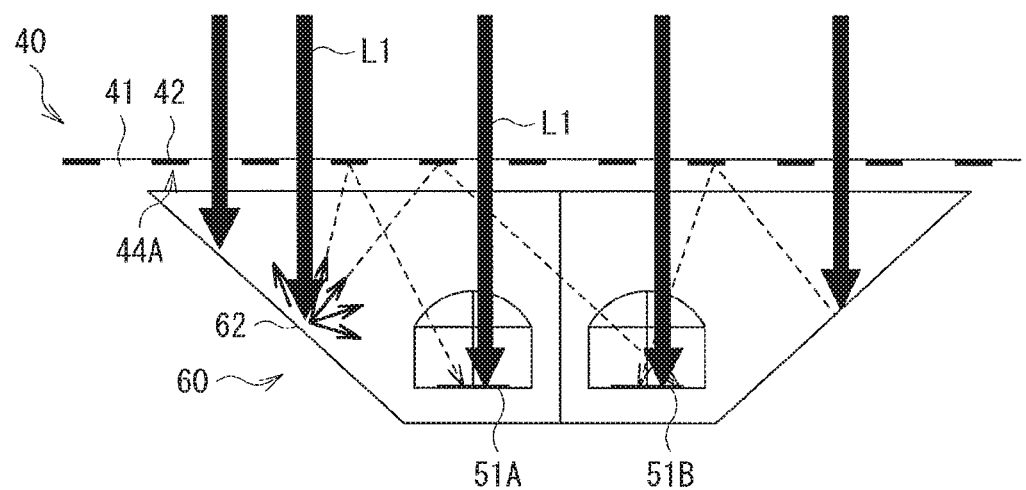

[ FIG. 17 ]
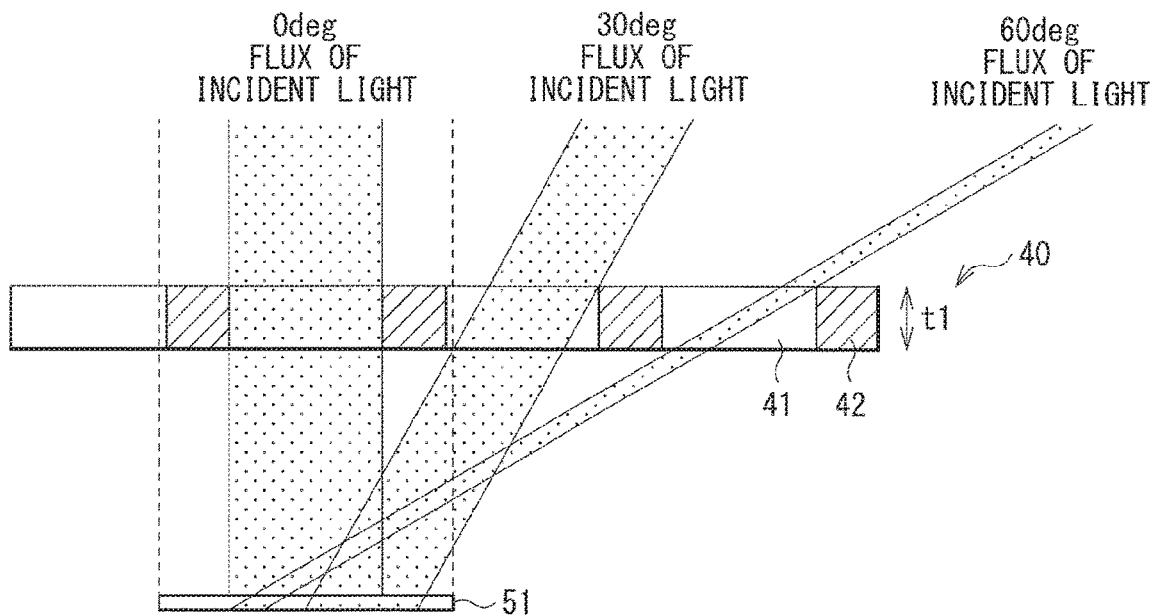
[ FIG. 18 ]
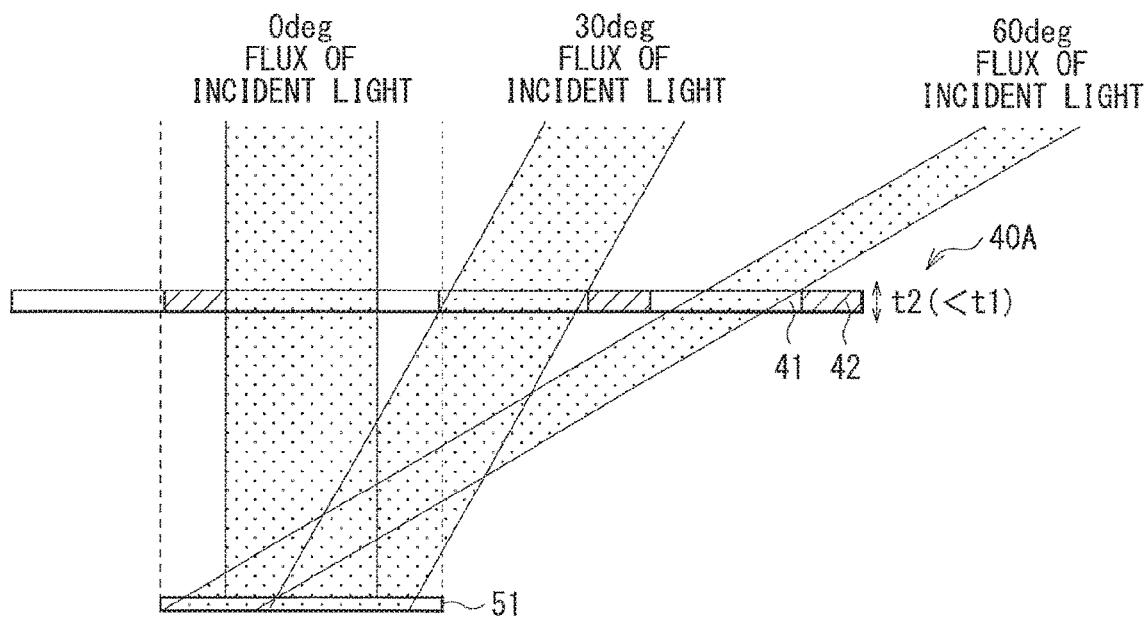

[ FIG. 19 ]
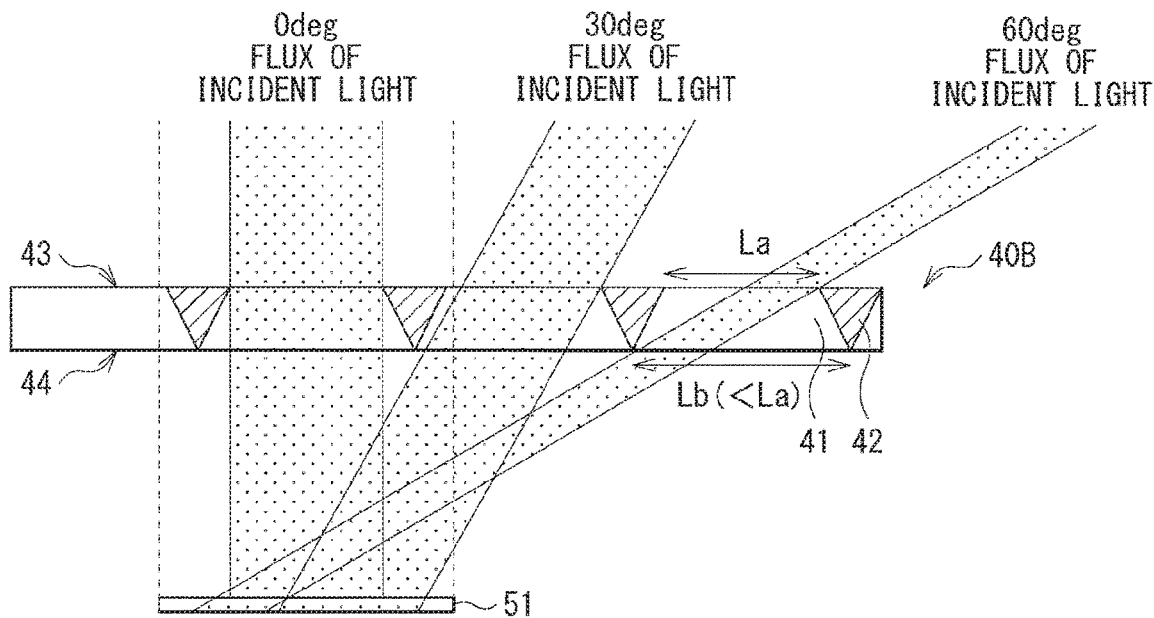
[ FIG. 20 ]
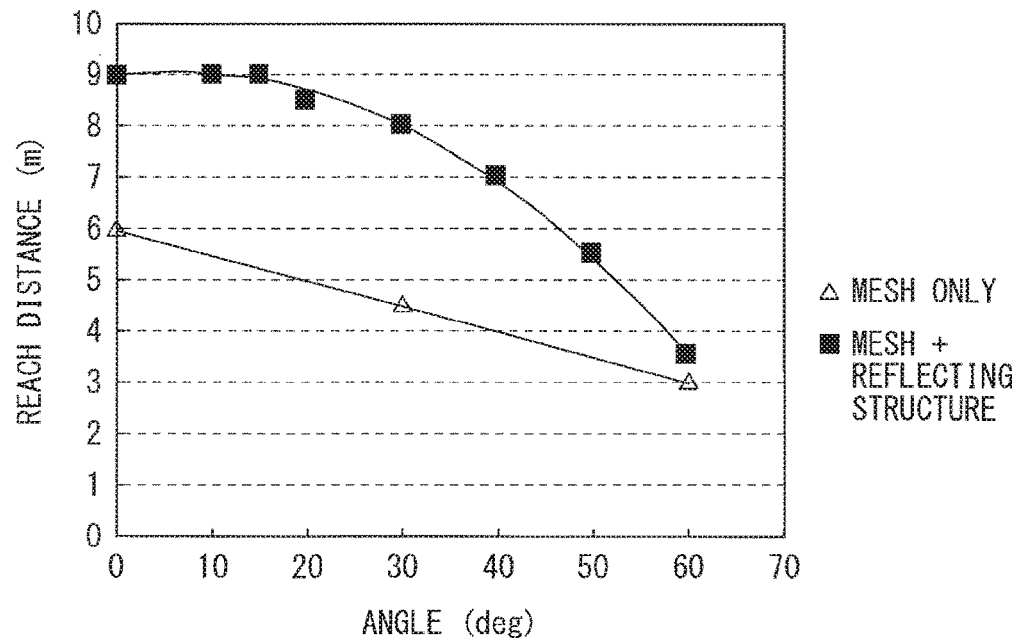

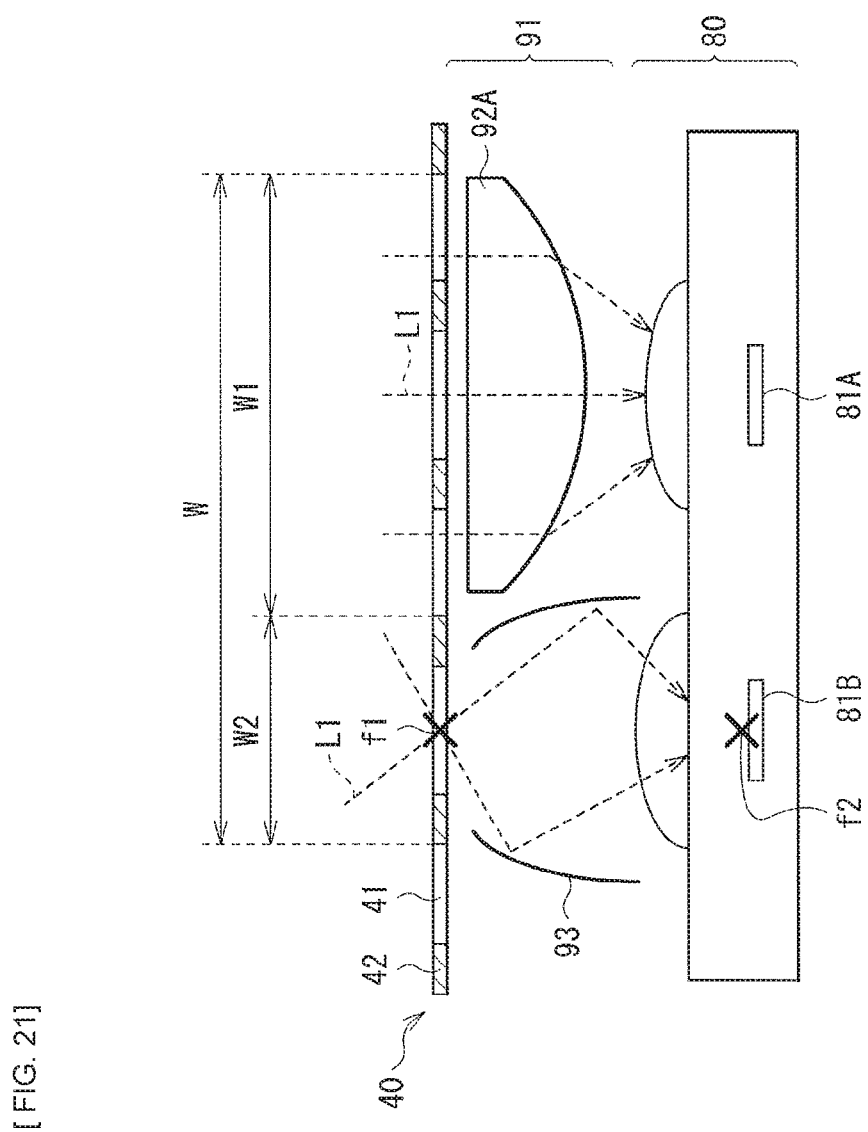

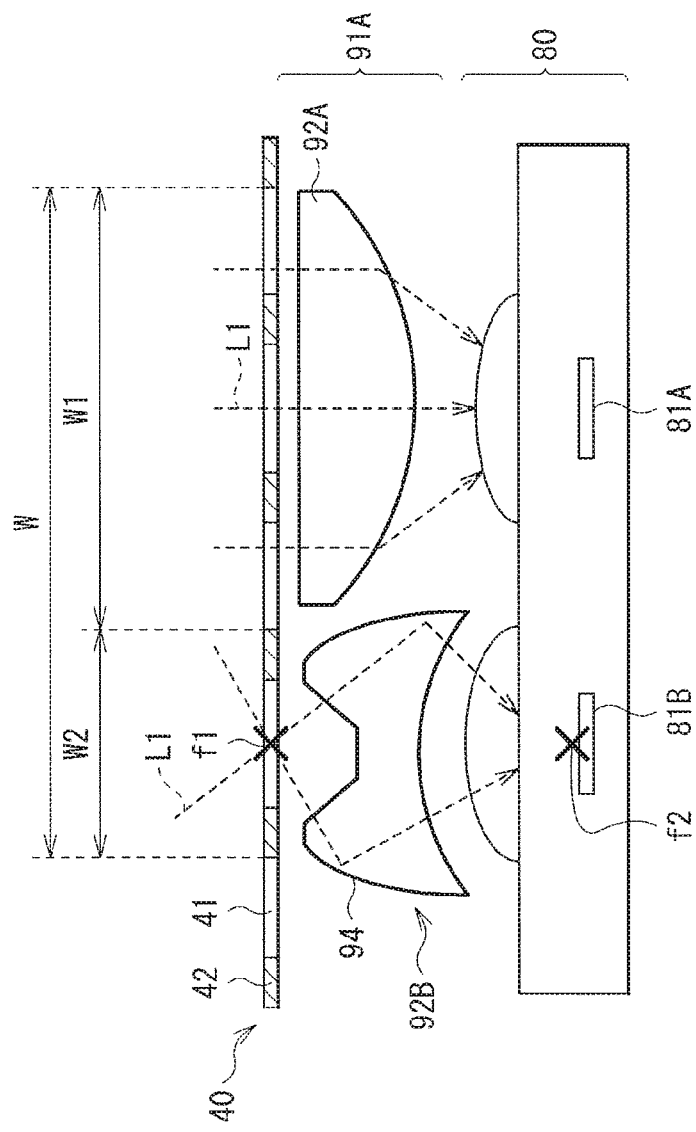
[FIG. 22]

[ FIG. 23 ]
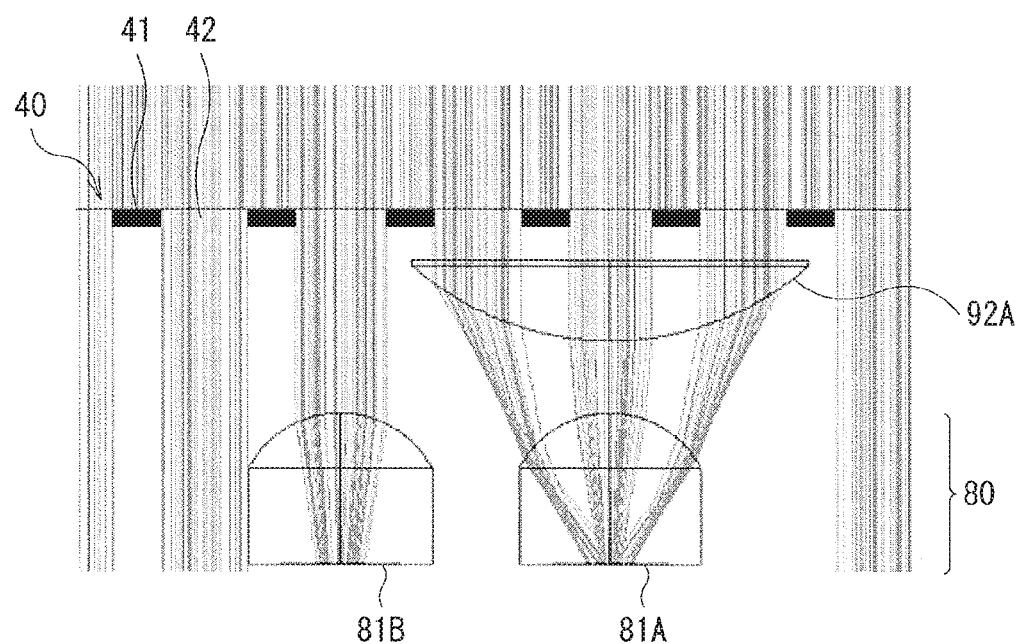
[ FIG. 24 ]
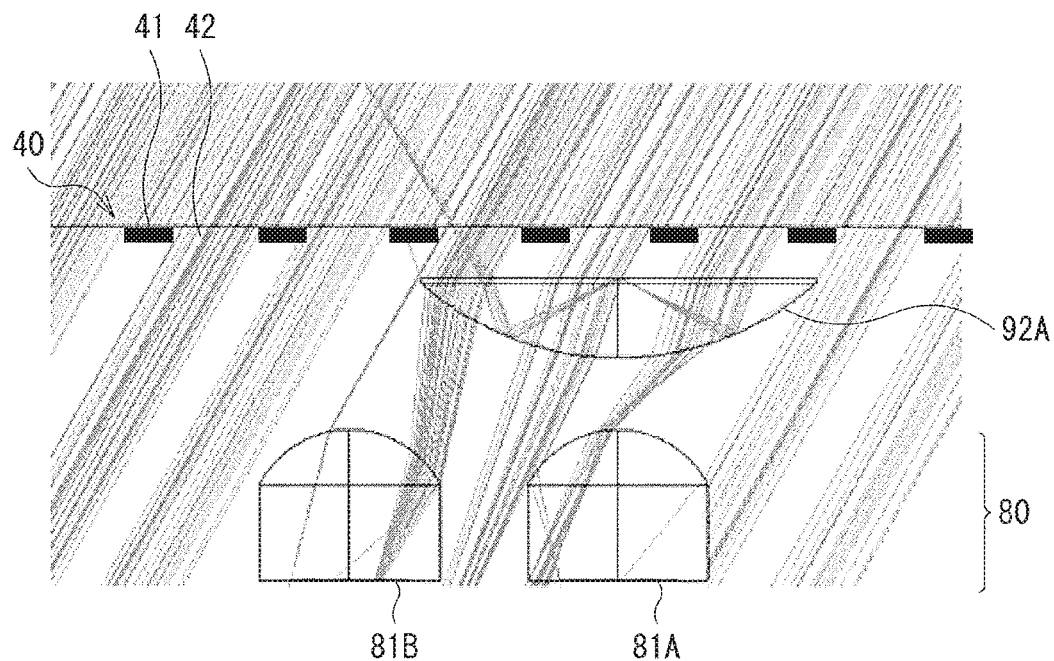

[ FIG. 25 ]
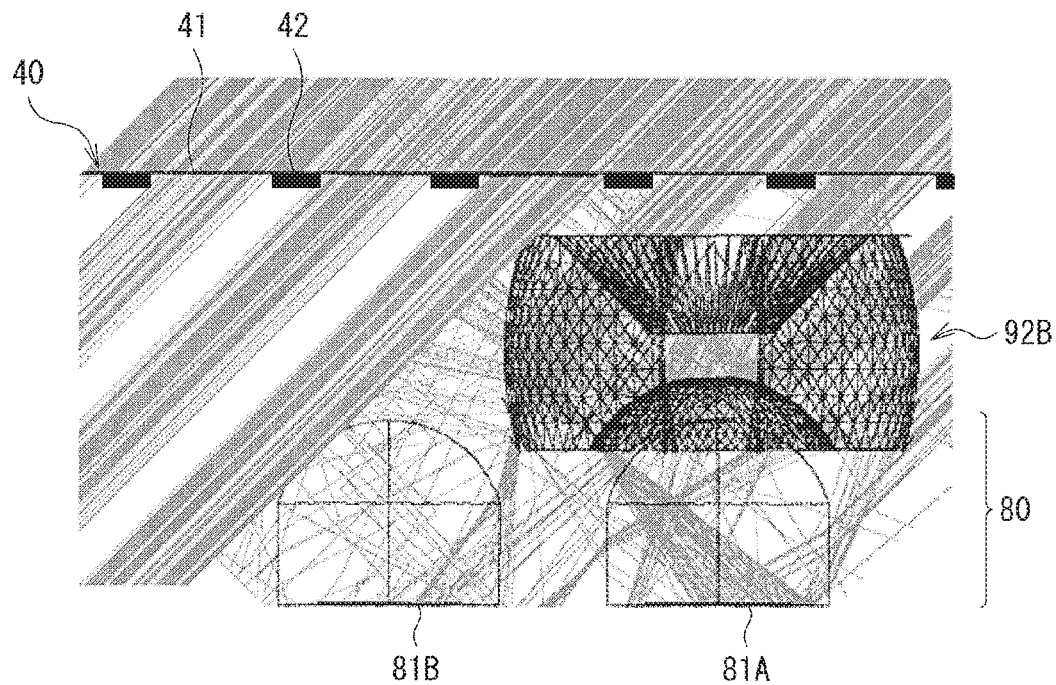
[ FIG. 26 ]
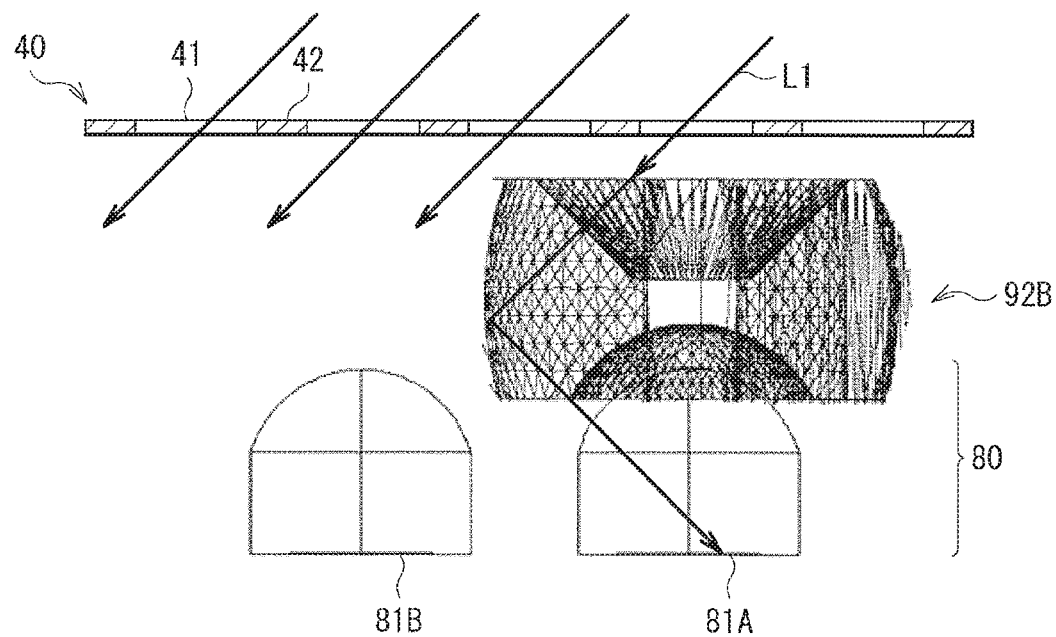

REMOTE DEVICE AND REMOTE DEVICE SYSTEM

CROSS REFERENCE TO RELATED APPLICATIONS

This application is a U.S. National Phase of International Patent Application No. PCT/JP2016/070229 filed on Jul. 8, 2016, which claims priority benefit of Japanese Patent Application No. JP 2015-172265 filed in the Japan Patent Office on Sep. 1, 2015. Each of the above-referenced applications is hereby incorporated herein by reference in its entirety.

TECHNICAL FIELD

The disclosure relates to a remote device and a remote device system that are both operable with optical remote controls (remote controller).

BACKGROUND ART

An optical remote device system using infrared rays includes: an optical remote control; and a device main body that is operable with this remote control. The remote control is provided with a light emitting body that emits infrared rays as signal light. The device main body is provided with a light receiver that receives the signal light. There are cases where the light receiver is provided inside the exterior of the device main body or another structure. As an example, PTL 1 proposes a technique in which a light receiver is provided inside the exterior. As another example, PTL 2 proposes a technique in which a light receiver is provided inside a speaker grille with punched holes.

CITATION LIST

Patent Literature

[PTL 1] Japanese Unexamined Patent Application Publication No. 2004-320304
[PTL 2] Japanese Unexamined Patent Application Publication No. H07-87424

SUMMARY OF INVENTION

In the techniques described in PTLs 1 and 2, the light receiver receives signal light through only one aperture in the exterior or the speaker grille. On the other hand, remote device systems that are compatible with a plurality of remote controls with different signal frequency bands have been recently developed. However, it is likely that the structure that receives light through a single aperture may not be able to ensure a distance and an angular range in each of which a signal is detectable for each of a plurality of signal frequency bands.

It is desirable to provide a remote device and a remote device system each of which makes it possible to improve light-reception sensitivity of optical remote controls while disposing a light receiver inside an exterior.

A remote device according to an embodiment of the disclosure includes: an exterior having a plurality of holes through which light passes, and having a structure in which a surrounding part of the holes blocks the light; a light receiver that is disposed inside the exterior, and receives signal light of one or more optical remote controls; and a light guiding section that is provided between the light receiver and a front surface of the exterior, and guides, to the light receiver, the signal light that has entered a predetermined region of the exterior. The predetermined region includes two or more of the holes.

A remote device system according to an embodiment of the disclosure includes: a first remote device operable with a first optical remote control; and a second remote device operable with a second optical remote control through an intervention of the first remote device, the second optical remote control being different from the first remote device in signal frequency band. The first remote device includes an exterior having a plurality of holes through which light passes, and having a structure in which a surrounding part of the holes blocks the light, a light receiver that is disposed inside the exterior, and receives signal light of each of the first optical remote control and the second optical remote control, and a light guiding section that is provided between the light receiver and a front surface of the exterior, and guides, to the light receiver, the signal light that has entered a predetermined region of the exterior. The predetermined region includes two or more of the holes.

In the remote device or the remote device system according to the embodiment of the disclosure, the signal light having entered the predetermined region of the exterior which includes two or more holes is guided to the light receiver by the light guiding section provided between the light receiver and the front surface of the exterior.

According to the remote device or the remote device system of the embodiment of the disclosure, the signal light having entered the predetermined region of the exterior which includes two or more holes is guided to the light receiver by the light guiding section provided between the light receiver and the front surface of the exterior. Hence, it is possible to improve light-reception sensitivity of the optical remote controls while disposing the light receiver inside the exterior.

The effects described above are not necessarily limiting, and any other effects described herein may be produced.

BRIEF DESCRIPTION OF DRAWINGS

FIG. 1 is a block diagram illustrating an example of a system configuration of a remote device system according to a first embodiment of the disclosure.

FIG. 2 is a perspective view of an example of an appearance of the first remote device.

FIG. 3 is a plan view of an example of an exterior of the first remote device.

FIG. 4 is a cross-sectional view of an example of the exterior of the first remote device.

FIG. 5 is a cross-sectional view of an example of structures of a light guiding section and a light receiver in the first remote device.

FIG. 6 is a perspective view of examples of a conical surface and a curved surface.

FIG. 7 is a perspective view of an example of a second-order curved surface.

FIG. 8 is a perspective view of an example of a paraboloidal surface.

FIG. 9 is a plan view of an example of a size of the holes in the exterior and a size of the light receiving sensor.

FIG. 10 is an explanatory view of an example of the amount of light received by the light receiving sensor and its detectable distance in a case where an incidence angle of signal light is 0°.

FIG. 11 is an explanatory view of an example of the amount of light received by the light receiving sensor and its detectable distance in a case where an incidence angle of signal light is 30°.

FIG. 12 is an explanatory view of an example of the amount of light received by the light receiving sensor and its detectable distance in a case where an incidence angle of signal light is 60°.

FIG. 13 is an explanatory view of an example of a result of simulating a state of the entry of the light in the light receiver with no mesh exterior present in a case where light enters a light receiver at an incidence angle of 0°.

FIG. 14 is an explanatory view of an example of a result of simulating a state of the entry of the light in the light receiver with a mesh exterior present but with no reflecting-diffusing structure present in a case where light enters a light receiver at an incidence angle of 0°.

FIG. 15 is an explanatory view of an example of a result of simulating a state of the entry of the light in the light receiver with both a mesh exterior present and a reflecting-diffusing structure present in a case where light enters a light receiver at an incidence angle of 0°.

FIG. 16 is a schematic, explanatory view of the entry state of the light illustrated in FIG. 15.

FIG. 17 is a schematic, cross-sectional view of a manner in which the amount of the light decreases in a case where light diagonally enters a mesh exterior.

FIG. 18 is a cross-sectional view of a structural example in which an exterior having a small thickness mitigates a decrease in the amount of incident light.

FIG. 19 is a cross-sectional view of a structural example in which an exterior having holes of an improved aperture shape mitigates a decrease in the amount of incoming light.

FIG. 20 is a characteristic view of an example of the dependence of a distance over which a remote control is operable on an angle.

FIG. 21 is a cross-sectional view of an example of structures of a light guiding section and a light receiver in a first remote device according to a second embodiment.

FIG. 22 is a cross-sectional view of a modification of the light guiding section illustrated in FIG. 21.

FIG. 23 is an explanatory view of an example of a result of simulating a state of the entry of the light in the light receiver in a case where light enters a light receiver at an incidence angle of 0° through an on-axis condenser lens.

FIG. 24 is an explanatory view of an example of a result of simulating a state of the entry of the light in the light receiver in a case where light enters a light receiver in a slanting direction through an on-axis condenser lens.

FIG. 25 is an explanatory view of an example of a result of simulating a state of the entry of the light in the light receiver in a case where light enters a light receiver in a slanting direction through a wide-angle condenser lens.

FIG. 26 is a schematic, explanatory view of the entry state of the light illustrated in FIG. 25.

DESCRIPTION OF EMBODIMENTS

Some embodiments of the disclosure will be described below in detail with reference to the accompanying drawings. The description will be given in the following order.

1. First embodiment (a remote device that includes a reflecting structure as a light guiding section) (FIGS. 1 to 20)
   1. 1 Outline of remote device system
   1. 2 Exterior and inner configuration examples of remote device
   1. 3 Effects
2. Second embodiment (a remote device that includes an on-axis optical member and a wide-angle optical member as a light guiding section) (FIGS. 21 to 26)
3. Other embodiments 1. First Embodiment 1. 1 Outline of Remote Device System An optical remote device system includes: an optical remote control; and a device main body that is operable with this optical remote control. The optical remote control is provided with a light emitting body that emits infrared rays as signal light. The device main body is provided with a light receiver having a light receiving sensor that receives the signal light.

Pieces of carrier light to be emitted are modulated, so that remote control signals are assigned to respective optical remote controls. In general, company products employ different carrier frequencies, as an example listed below.
   Company A: 38 kHz
   Company B: 40 kHz
   Company C: 36 kHz
   Company D: 30 kHz A typical product includes a product-dedicated optical remote control and a product-dedicated light receiving sensor. The optical remote control and the light receiving sensor employ a one-to-one configuration. Thus, the light receiver has a built-in notch filter specialized so as to be able to receive only a frequency band that ranges between ±10% or less of a carrier frequency. In addition, a light receiving amplifier is used with its gain increased so that the light receiver is able to receive signal light with high sensitivity. With this product configuration, it is possible to improve a signal-to-noise ratio (S/N), thereby detecting even a weak signal light, i.e., able to operate the remote control, and to ensure a sufficient detectable distance.

In recent years, there have been optical remote controls each of which is compatible with a plurality of products, and products each of which is operable with a plurality of optical remote controls. In a case where a product is operable with a plurality of optical remote controls, its light receiving sensor and the optical remote controls constitute a one-to-many configuration. Therefore, it is necessary for the light receiver to receive signals over a wide signal frequency band. For example, it is necessary for the light receiver to support a signal frequency band as listed below.
General-purpose Company A: 33 kHz to 40 kHz
General-purpose Company B: 20 kHz to 40 kHz In the light receiver configured above, it is necessary for a filter provided in the light receiver to have a wide pass band in order to support a plurality of modulation frequencies. This also widens its noise band, thus making it difficult to increase a gain of a light receiving amplifier. In this case, the light receiver may fail to amplify a received signal, so that the signal is masked by noise. As a result, its signal detectable distance may tend to be shortened.

Nevertheless, there are some products that ensure a long signal detectable distance and a wide signal detectable angle in ordinary use. In an exemplary configuration, a light receiving sensor is provided on the exterior surface of a device main body. In another exemplary configuration, a light receiving sensor is disposed inside the exterior, and the entire surface of a portion of the exterior that signal light enters is covered with a material, such as glass or a plastic, that passes the signal light.

However, in a case where the exterior is not a transparent body and has a structure, such as a mesh structure or a punched metal structure, that passes the light partially, only part of light reaches the interior of the device. In this case, in a case where a light receiving sensor is disposed inside the exterior, the intensity of the signal is lowered. In a case of receiving signal light diagonally entering an exterior having a mesh structure, for example, the amount of light reaching the interior is lowered in proportional to cosine of an incidence angle θ (cos θ). Thus, in a case where a typically available light receiving sensor that supports one-to-many communication is used, the coexistence of this light receiving sensor and a design specialized for an exterior, such as a mesh structure, may be difficult.

The present embodiments provide techniques capable of improving light-reception sensitivity of optical remote controls even when a light receiving sensor is disposed inside an exterior having a mesh structure, for example, and the light receiving sensor and the optical remote controls employ a one-to-many configuration.

FIG. 1 illustrates an outline of a remote device system 1 according to a first embodiment of the disclosure.

The remote device system 1 includes a relay 2, a first remote device 11, a second remote device 12, a third remote device 13, an IR blaster 31, and an IR blaster 32. Furthermore, the remote device system 1 includes a first optical remote control 21, a second optical remote control 22, and a third optical remote control 23.

The first optical remote control 21 is used to operate the first remote device 11. The second optical remote control 22 is used to operate the second remote device 12. The third optical remote control 23 is used to operate the third remote device 13.

In this example, the three remote devices and optical remote controls are present. However, four or more or two or less remote devices and optical remote controls may be present.

Each of the first optical remote control 21, the second optical remote control 22, and the third optical remote control 23 outputs signal light that utilizes infrared rays. Their signal frequency bands may differ from one another. As an example, the first optical remote control 21 and the first remote device 11 may be a product of Company A which has a signal frequency band of 38 kHz as described above. As another example, the second optical remote control 22 and the second remote device 12 may be a product of Company B which has a signal frequency band of 40 kHz as described above. As still another example, the third optical remote control 23 and the third remote device 13 may be a product of Company C which has a signal frequency band of 36 kHz as described above.

The first remote device 11 has a light receiver 50. The light receiver 50 is disposed inside an exterior 40 that will be described later and receives pieces of signal light from the first optical remote control 21, the second optical remote control 22, and the third optical remote control 23, respective signal frequency bands of which differ from one another.

The second remote device 12 has an unillustrated light receiver that receives signal light in a signal frequency band supported by the second optical remote control 22. The third remote device 13 has an unillustrated light receiver that receives signal light in a signal frequency band supported by the third optical remote control 23.

The first remote device 11 and the relay 2 are wirelessly coupled to each other, for example. The second remote device 12 and the third remote device 13 are wire-coupled to the relay 2, for example. The IR blasters 31 and 32 are wire-coupled to the relay 2, for example.

The first remote device 11 may be a projector, for example. Each of the second remote device 12 and the third remote device 13 may be a recorder, a TV (television), or the like having video recording and reproducing functions. The second remote device 12 and the third remote device 13 may be disposed in a room that is separated from a room for the first remote device 11. For example, the first remote device 11 may be disposed in a bedroom, etc., and the second remote device 12 and the third remote device 13 may be disposed in a living room, etc.

The first remote device 11 receives signal light from the first optical remote control 21 through the light receiver 50. The first remote device 11 is thereby operated directly with the first optical remote control 21.

Further, the light receiver 50 in the first remote device 11 receives signal light from the second optical remote control 22. The signal that first remote device 11 has received from the second optical remote control 22 is transmitted to the IR blaster 31 by way of the relay 2. The IR blaster 31 transmits the signal, received from the second optical remote control 22 by way of the relay 2, to the second remote device 12. In this way, the second remote device 12 is operated with the second optical remote control 22 through the first remote device 11, the relay 2, and the IR blaster 31.

Further, the light receiver 50 in the first remote device 11 receives signal light from the third optical remote control 23. The signal that the first remote device 11 has received from the third optical remote control 23 is transmitted to the IR blaster 32 by way of the relay 2. The IR blaster 32 transmits the signal, received from the third optical remote control 23 by way of the relay 2, to the third remote device 13. In this way, the third remote device 13 is operated with the third optical remote control 23 through the first remote device 11, the relay 2, and the IR blaster 32.

As described above, the remote device system 1 enables the second remote device 12 and the third remote device 13 to be remotely controlled through an intervention of the first remote device 11 present in another room. Thus, it is possible to achieve remote operation in which, for example the first remote device 11 reproduces data recorded in the second remote device 12 or the third remote device 13 located in another room.

1. 2 Examples of Exterior and Internal Configuration of Remote Device

FIG. 2 illustrates an example of a configuration of an appearance of the first remote device 11. FIG. 3 illustrates an example of a planar configuration of the exterior 40. FIG. 4 illustrates an example of a cross-sectional configuration of the exterior 40. FIG. 5 illustrates an example of structures of a light guiding section 61 and the light receiver 50 in the first remote device 11.

Outline of Exterior 40

The first remote device 11 is provided with the exterior 40 that has a structure, such as a dot structure of a punched metal, that allows only part of light to reach the interior but blocks the remaining part to prevent entry into interior. The exterior 40 has holes 41 through which light passes, and has a structure in which a surrounding part of the holes 41 blocks light. The exterior 40 has a predetermined thickness t1 between a front surface 43 and a back surface 44, as illustrated in FIG. 4.

As described above, the first remote device 11 is a projector, for example. To maintain its brightness, such a projector uses part of optical energy output from its light source to project an image, but the remaining part of this light is converted into heat. Thus, the projector has to exhaust the heat. In general, a projector employs an air cooling system with a fan. However, there is a demand for the exterior 40 to have a mesh structure for the purpose of achieving a balance with a design. In a case where a mesh structure is provided on the entire exterior without any partial change, it is necessary to provide the following structure between the exterior 40 and the light receiver 50.

Example of Internal Configuration of Exterior 40

As illustrated in FIG. 5, the light guiding section 61 is provided between the light receiver 50 and the front surface 43 of the exterior 40. The light guiding section 61 guides, to the light receiver 50, the signal light L1 that has entered a predetermined region W of the exterior 40 which includes two or more holes 41. Preferably, the light guiding section 61 may guide, to the light receiver 50, the signal light L1 that has entered the predetermined region W including three or more holes 41. The light guiding section 61 has a reflecting structure 60. This reflecting structure 60 may be a reflecting-diffusing structure. In addition, the light guiding section 61 has a reflecting back surface 44A that is provided on the back surface 44 of the exterior 40 and corresponds to the predetermined region W.

Between the exterior 40 and the light receiver 50 may be provided a visible light cutoff filter 70. This visible light cutoff filter 70 may be disposed between the back surface 44 of the exterior 40 and the reflecting structure (or reflecting-diffusing structure) 60.

The light receiver 50 includes: a substrate 54 on which the light receiving sensor 51 is mounted; a condenser lens 52 that collects the signal light L1 coming from the light guiding section 61 and focuses the signal light L1 on the light receiving sensor 51; and a support body 53 that supports the condenser lens 52 over the substrate 54. A plurality of light receiving sensors 51 may be provided. For example, a horizontal-direction light receiving sensor and a vertical-direction light receiving sensor may be provided in order to efficiently receive a wide area of signal light L1. The horizontal-direction light receiving sensor may receive signal light traveling in a horizontal direction, whereas the vertical-direction light receiving sensor may receive signal light traveling in a vertical direction.

The light guiding section 61 includes a predetermined surface provided between the light receiver 50 and the back surface 44 of the exterior 40. This predetermined surface has at least a light reflecting function. The predetermined surface may further have a light diffusing function. As this predetermined surface, a reflecting surface (or reflecting-diffusing surface) 62 may be formed on the inner periphery of the reflecting structure (or reflecting-diffusing structure) 60. The reflecting structure (or reflecting-diffusing structure) 60 has an aperture on the upper side (on the substrate 54 side) which corresponds to the predetermined region W. In addition, the reflecting structure or reflecting-diffusing structure 60 has an aperture on the lower side (on the exterior 40 side) which corresponds to the size of the light receiver 50.

FIGS. 6 to 8 each illustrate a dimensional example of the reflecting surface (or reflecting-diffusing surface) 62 as the predetermined surface.

The reflecting surface (or reflecting-diffusing surface) 62 may be a segment of a conical surface whose surface area decreases toward the light receiver 50. For example, as illustrated in the left part of FIG. 6, the reflecting surface (or reflecting-diffusing surface) 62 may be a segment of a conical surface 63. In a case where the light receiver 50 has a single light receiving sensor 51, the reflecting structure (or reflecting-diffusing structure) 60 may be a conical body having the conical surface 63. The light receiving sensor 51 may be disposed at or near substantially the peak of the conical body.

In a case where the light receiving sensor 51 has a configuration in which a first light receiving sensor 51A for a horizontal direction and a second light receiving sensor 51B for a vertical direction are disposed side by side, for example, the reflecting surface (or reflecting-diffusing surface) 62 may be a curved surface 63A, for example, as illustrated in the right part of FIG. 6. For example, the curved surface 63A may be a surface obtained as the reflecting structure (or reflecting-diffusing structure) 60 by stretching a conical body in the direction toward the light receiving sensor 51.

As illustrated in FIG. 7, the reflecting surface (or reflecting-diffusing surface) 62 may be a segment of a second-order curved surface 64 whose surface area decreases toward the light receiver 50. The reflecting structure (or reflecting-diffusing structure) 60 may be a second-order curved body having the second-order curved surface 64. The light receiving sensor 51 may be disposed at or near substantially the peak of the second-order curved body.

As illustrated in FIG. 8, the reflecting surface (or reflecting-diffusing surface) 62 may be a segment of a paraboloidal surface 65 whose surface area decreases toward the light receiver 50. The reflecting structure (or reflecting-diffusing structure) 60 may be a paraboloidal body having the paraboloidal surface 65. The light receiving sensor 51 may be disposed so as to substantially coincide with a focal point 65$f$ of the paraboloidal surface 65 or near the focal point 65$f$.

Workings of Light Guiding Section 61

A description will be given of workings of the light guiding section 61. It is to be noted that the description will be mainly focused on workings as a result of providing the reflecting-diffusing structure 60.

FIG. 9 illustrates examples of a size of the holes 41 in the exterior 40 and a size of the light receiving sensor 51.

The light receiving efficiency depends on a mesh structure, more specifically the size and density of the holes 41. For example, a mesh structure illustrated in FIG. 9 may be used as a precondition. More specifically, the description will be given under the following preconditions. In the mesh, a hole diameter is Φ1.2 mm, an interval between the centers of adjacent holes 41 in a lateral direction is 1.7 mm, and an interval between the centers of adjacent holes 41 in a longitudinal direction is also 1.7 mm. In the light receiving sensor 51, a diameter of a detection surface of the light receiving sensor 51 is Φ2.3 mm.

FIGS. 10 to 12 describe a comparison between light receiving efficiencies at different incidence angles. FIGS. 10 to 12 each illustrate a characteristic of a structure in which the exterior 40 having a mesh structure is present and the reflecting-diffusing structure 60 is provided, and further illustrate characteristics of comparative examples in which the exterior 40 having a mesh structure is absent and thus the signal light L1 directly enters the light receiver 50 and in which the exterior 40 having a mesh structure is present but the reflecting-diffusing structure 60 is not provided.

FIG. 10 illustrates an example of the amount of light received by the light receiving sensor 51 and its detectable distance in a case where an incidence angle of the signal light L1 is 0°. FIG. 11 illustrates an example of the amount of light received by the light receiving sensor 51 and its detectable distance in a case where an incidence angle of the signal light L1 is 30°. FIG. 12 illustrates an example of the amount of light received by the light receiving sensor 51 and its detectable distance in a case where an incidence angle of the signal light L1 is 60°.

FIGS. 13 to 15 each illustrate an example of a result of simulating a state of the entry of light in the light receiver 50. FIG. 13 is an explanatory view of an example of a result of simulating a state of the entry of the light in the light receiver 50 with the exterior 40 having a mesh structure absent in a case where light enters the light receiver 50 at an incidence angle of 0°. FIG. 14 is an explanatory view of an example of a result of simulating a state of the entry of the light in the light receiver 50 with the exterior 40 having a mesh structure present but with the reflecting-diffusing structure 60 absent in a case where light enters the light receiver 50 at an incidence angle of 0°. FIG. 15 is an explanatory view of an example of a result of simulating a state of the entry of the light in the light receiver 50 with the exterior 40 having a mesh structure present and with the reflecting-diffusing structure 60 present in a case where light enters the light receiver 50 at an incidence angle of 0°. FIG. 16 is a schematic, explanatory view of the entry state of the light illustrated in FIG. 15.

Note that FIGS. 13 to 16 each illustrate a case where the light receiver 50 includes the first light receiving sensor 51A and the second light receiving sensor 51B as the light receiving sensor 51.

As illustrated in FIG. 10, the amount of light received is set to 1 in a case where the exterior 40 having a mesh structure is absent and the incidence angle of the signal light L1 is 0°. In addition, the distance over which the light receiving sensor 51 is able to detect a reference is set to 11 m. In contrast, in a case where the exterior 40 having a mesh structure is present but the reflecting-diffusing structure 60 is not provided, it is found that the amount of light that the light receiving sensor 51 is able to receive is decreased to ⅓ or less. In this case, as a precondition, the signal light L1 is output from the optical remote control positioned at a sufficiently long distance and propagates in a parallel and in mesh from. An aperture ratio of the mesh which is determined using a simple area ratio becomes about 40%. When the reflecting-diffusing structure 60 is not provided, only about 27% of light passes through the mesh and reaches the sensor actually due to a disposed location of the light receiving sensor 51. When the reflecting-diffusing structure 60 is not provided, the detectable distance is approximately halved, namely, became 5.7 m.

As illustrated in FIGS. 11 and 12, in a case where light diagonally enters the light receiver 50 through the mesh with no reflecting-diffusing structure 60 provided, the amount of light is greatly decreased to 10% to 20%. This decrease in the mount of light is due to a phenomenon in which diagonally incoming light is blocked by the mesh. FIG. 17 schematically illustrates a manner in which the amount of the light decreases in a case where light diagonally enters the exterior 40 having a mesh structure.

In a case where light diagonally enters the light receiver 50, in a case where the reflecting-diffusing structure 60 is not provided, the detectable distance of as short as about 3 m to 4 m is ensured. This means that it is difficult to perform the operation over a long distance by using optical remote controls. Thus, it is difficult to say that this performance is satisfactory in actual use. In a case where the reflecting-diffusing structure 60 is present, as illustrated in FIG. 16, not only light that has passed through holes 41 positioned directly above the light receiving sensor 51 (namely, the first light receiving sensor 51A and second light receiving sensor 51B), but also light that has passed through a plurality of surrounding holes 41 reaches the reflecting structure 60, and is reflected and diffused by the reflecting-diffusing structure 60. Part of this diffused light reaches the light receiving sensor 51. In addition, the light that has been reflected by the reflecting-diffusing structure 60 is returned to the exterior 40 side. Then, part of this light is reflected on the reflecting back surface 44A provided on the back surface 44 of the exterior 40 and reaches the light receiving sensor 51. In this way, providing the light guiding section 61 makes it possible to form an optical path along which light is reflected and diffused by the reflecting-diffusing structure 60, then reflected and diffused again on the reflecting back surface 44A of the exterior 40, and guided to the light receiving sensor 51.

As a result, in a case where the reflecting-diffusing structure 60 is provided, about 70% of light incident at an angle of 0° reaches the light receiving sensor 51 even in the case where the exterior 40 having a mesh structure is present, in comparison with the case where the exterior 40 having a mesh structure is absent. In a case where light is diagonally incident at an angle of 30°, the light receiving amount becomes 55%, in which case it is possible to ensure the detectable distance of 8.2 m.

Moreover, by providing the reflecting-diffusing structure 60 with, in addition to a simple reflective property, a diffusing property through a blasting process, for example, it is possible to effectively guide diagonally incident light at various angles. This makes it possible to increase an amount of light that enters the light receiving sensor 51 as compared with a case where the reflecting-diffusing structure 60 is not provided.

Note that using an optical lens is effective in simply collecting light. In fact, using an optical lens is highly effective for light incident at an angle of 0°. However, the optical lens typically focuses diagonally incident light at a shifted location, in which case the light may reach the outside of the light receiving surface of the light receiving sensor 51. At the moment when the light deviates from the light receiving surface of the light receiving sensor 51, the light detectable distance excessively and suddenly decreases. For this reason, a structure, such as the reflecting-diffusing structure 60, that has a function of widening an area for light collection while diffusing the light is more suitable.

FIG. 18 illustrates a structural example in which an exterior 40 having a small thickness t1 mitigates a decrease in the amount of incident light. Like an exterior 40A illustrated in FIG. 18, a thickness t2 of the exterior 40 in a predetermined region W may be set to be smaller than the thickness t1 of the exterior 40 in a region other than the predetermined region W. In order to guide a large amount of light to the reflecting structure (or reflecting-diffusing structure) 60, the exterior 40A may have a partly small thickness, like the exterior 40A illustrated in FIG. 18. This makes it possible to reduce a flux of diagonally incident light to be shaded by the cross section of the exterior 40A, thereby increasing the amount of light guided to the light receiver 50 or the reflecting structure (or reflecting-diffusing structure) 60.

FIG. 19 illustrates a structural example in which an exterior 40 provided with holes 41 having an improved aperture shape mitigates a decrease in the amount of incident light. Like the exterior 40B illustrated in FIG. 19, holes 41 in a predetermined region W may have an aperture shape that becomes large toward a back surface 44 of the exterior 40. In the exterior 40, thus, an aperture size La of the holes 41 in the predetermined region W on a front surface 43 may be larger than an aperture size Lb of the holes 41 in the predetermined region W on the back surface 44. In short, the relationship Lb<La may be satisfied. Tapering the holes 41 toward the inside of the exterior 40 in this manner makes it possible to efficiently guide diagonally incident light, similar to the above.

However, providing the entire surface of the exterior 40 with the structure as in FIGS. 18 and 19 may cause lowering of strength of the exterior 40, an increase in cost, etc. Therefore, the structure is desirably applied to only the predetermined region W that signal light L1 enters.

FIG. 20 illustrates an example of the dependence of a distance over which a remote control operation is possible on an angle. In FIG. 20, the horizontal axis represents an angle at which the signal light L1 is incident on the front surface 43 of the exterior 40. The vertical axis represents a distance over which the signal light L1 is able to reach the light receiver 50 (a remote control operable distance). FIG. 20 illustrates a characteristic in which the mesh is present and the reflecting-diffusing structure 60 is provided and further illustrates a characteristic as a comparative example in which the mesh is present as the exterior 40 but the reflecting-diffusing structure 60 is not provided. Providing the reflecting-diffusing structure 60 increases the signal light L1 that enters, thereby greatly improving the remote control operable distance.

1. 3 Effect

In this embodiment, as described above, the signal light L1 that enters the predetermined region W of the exterior 40 which includes two or more holes 41 is guided, to the light receiver 50, by the light guiding section 61 provided between the light receiver 50 and the front surface 43 of the exterior 40. Thus, it is possible to increase the light-reception sensitivity of the optical remote controls while disposing the light receiver 50 inside the exterior 40.

If a device, such as a projector, designed to put emphasis on its heat exhaust property and place a value on its product exterior attempts to support a wide frequency band for optical remote controls, the exterior may block light, making the light-reception sensitivity of the optical remote controls insufficient. This embodiment, however, enables even such devices to improve the light-reception sensitivity of the optical remote controls.

It is to be noted that the effects described herein are examples and non-limiting, and some other effects may be produced. This may also apply to effects of other embodiments that will be described below.

2. Second Embodiment

Next, a second embodiment of the disclosure will be described. Hereinafter, descriptions of parts that have substantially the same configurations and functions as those in the foregoing first embodiment will be omitted as appropriate.

FIG. 21 illustrates structural examples of a light guiding section 91 and a light receiver 80 in a first remote device 11 according to a second embodiment. FIG. 22 illustrates a modification of the light guiding section 91 illustrated in FIG. 21. In FIG. 22, a light guiding section 91A is provided instead of the light guiding section 91 illustrated in FIG. 21.

The light receiver 80 includes an on-axis light receiving sensor 81A and a wide-angle light receiving sensor 81B as first and second light receiving sensors, respectively.

The light guiding section 91 includes an on-axis condenser lens 92A as a first optical member. This on-axis condenser lens 92A guides at least signal light L1 that has entered a first region W1 of a predetermined region W to an on-axis light receiving sensor 81A.

The light guiding section 91 includes a second optical member. This second optical member guides at least signal light L1 which has entered a second region W2 of the predetermined region W to the second light receiving sensor. The second optical member has an oval surface provided with a light reflecting function. A single hole 41 is disposed in the second region W2 at a first focal position f1 of the oval surface. A wide-angle light receiving sensor 81B is disposed at a second focal position f2 of the oval surface.

In the structural example of FIG. 21, a reflecting oval inner surface body is provided as the second optical member. This reflecting oval inner surface body has a wide-angle reflecting oval surface 93 as its inner surface. In the structural example of FIG. 22, a wide-angle condenser lens 92B is provided as the second optical member. This wide-angle condenser lens 92B is a second condenser lens and has an oval surface 94 as its side surface. The oval surface 94 is a totally reflecting inner surface that reflects light in accordance with the difference in index of refraction between the wide-angle condenser lens 92B and its outside. The wide-angle condenser lens 92B may be a reflecting oval inner surface body made of a material such as resin or glass.

In general, many remote control light receivers have a configuration in which a sensor module is provided with two detection parts. For example, a remote control light receiver has a configuration having two horizontal and vertical detection parts or a configuration having on-axis and wide-angle detection parts, depending on various purposes. In this embodiment, as an example, the on-axis light receiving sensor 81A and the wide-angle light receiving sensor 81B are disposed, as illustrated in FIGS. 21 and 22. In addition, for the on-axis light receiving sensor 81A and the wide-angle light receiving sensor 81B are disposed the first and second optical members, respectively, that guide the signal light L1.

An on-axis condenser lens 92A used as the first optical member has a power component and guides a wide area of light to the on-axis light receiving sensor 81A by virtue of optical refraction. The on-axis condenser lens 92A collects a large amount of light owing to the collection of light from a plurality of holes 41. However, when light diagonally enters, the focal point of the on-axis condenser lens 92A is displaced depending on its incidence angle, and the focal point may deviate from the light receiving surface, resulting in a decrease in the amount of detected light to substantially zero. To compensate this, a second optical member is disposed on the other side.

As illustrated in FIG. 21 or 22, using the second optical member (namely, the wide-angle reflecting oval surface 93 or the wide-angle condenser lens 92B) makes it possible to collect diagonally incident light to the light receiver 80. As a property of an ellipse, when light rays are reflected by the ellipse after having passed through a focal point of the ellipse, the light rays also pass through the other focal point. The wide-angle reflecting oval surface 93 or the oval surface 94 of the wide-angle condenser lens 92B utilizes this property to guide light to the wide-angle light receiving sensor 81B.

In the structural example of FIG. 22, the wide-angle condenser lens 92B has a conical-like concave shape on its input side (on the exterior 40 side), in order to decrease an angle at which light refracts when entering the lens. In addition, the wide-angle condenser lens 92B has a concave shape with a curvature on its output side (on the wide-angle light receiving sensor 81B side), for the purpose of reducing the total reflection of light on the inner surface. These shapes make it possible to guide light to the wide-angle light receiving sensor 81B with reduced loss of light in terms of both input and output.

FIG. 23 is an explanatory view of an example of a result of simulating a state of the entry of the light in the light receiver 80 (the on-axis light receiving sensor 81A) in a case where light enters at an incidence angle of 0° through the on-axis condenser lens 92A. FIG. 24 is an explanatory view of an example of a result of simulating a state of the entry of the light in the light receiver 80 (on-axis light receiving sensor 81A) in a case where light diagonally enters at an angle of 45° through the on-axis condenser lens 92A.

FIG. 25 is an explanatory view of an example of a result of simulating a state of the entry of the light in the light receiver 80 (on-axis light receiving sensor 81A) in a case where light diagonally enters at an angle of 45° through the wide-angle condenser lens 92B. FIG. 26 is a schematic, explanatory view of an entry state of the light illustrated in FIG. 25.

In FIGS. 23 to 26, the on-axis condenser lens 92A and the wide-angle condenser lens 92B are disposed at substantially the same location, for the sake of convenience in comparing the entry states of light; however, the on-axis condenser lens 92A and the wide-angle condenser lens 92B are in fact disposed at different locations. As illustrated in FIG. 22, the wide-angle condenser lens 92B is in fact disposed in relation to the wide-angle light receiving sensor 81B.

As illustrated in FIGS. 23 and 24, the on-axis condenser lens 92A is able to guide the light to the on-axis light receiving sensor 81A for the light that enters the on-axis condenser lens 92A at an incidence angle of 0° but is not able to sufficiently guide the light when light diagonally enters the on-axis condenser lens 92A. As illustrated in FIGS. 25 and 26, in contrast, the wide-angle condenser lens 92B successfully guides, to the sensor, the light that diagonally enters by virtue of a reflecting function of the oval surface 94.

Other configurations, workings, and effects may be substantially the same as those of the remote device 11 and the remote device system 1 according to the foregoing first embodiment.

3. Other Embodiments

The techniques of the disclosure are not limited to the foregoing embodiments and may be modified in various ways.

For example, the technology may have configurations described below.

(1) A remote device including:
an exterior having a plurality of holes through which light passes, and having a structure in which a surrounding part of the holes blocks the light;
a light receiver that is disposed inside the exterior, and receives signal light of one or more optical remote controls; and
a light guiding section that is provided between the light receiver and a front surface of the exterior, and guides, to the light receiver, the signal light that has entered a predetermined region of the exterior, the predetermined region including two or more of the holes.

(2) The remote device according to (1), in which the light guiding section includes a predetermined surface, the predetermined surface being provided between the light receiver and a back surface of the exterior and having at least a light reflecting function.

(3) The remote device according to (2), in which the predetermined surface further has a light diffusing function.

(4) The remote device according to (2) or (3), in which the predetermined surface has a curved surface shape.

(5) The remote device according to (4), in which the predetermined surface is a conical surface having surface area that decreases toward the light receiver.

(6) The remote device according to (4), in which the predetermined surface is a paraboloidal surface having surface area that decreases toward the light receiver.

(7) The remote device according to (4), in which the predetermined surface is an oval surface.

(8) The remote device according to (1), in which
the light receiver includes a first light receiving sensor and a second light receiving sensor, and
the light guiding section includes a first optical member and a second optical member, the first optical member guiding, to the first light receiving sensor, at least the signal light that has entered a first region of the predetermined region, the second optical member guiding, to the second light receiving sensor, the signal light that has entered a second region of the predetermined region.

(9) The remote device according to (8), in which
the first optical member includes a first condenser lens, and
the second optical member has an oval surface having a light reflecting function, one of the holes in the second region being disposed at a first focal position of the oval surface, and the second light receiving sensor being disposed at a second focal position of the oval surface.

(10) The remote device according to (9), in which the second optical member includes a second condenser lens having a side surface that is the oval surface.

(11) The remote device according to any one of (1) to (10), in which the light guiding section guides, to the light receiver, the signal light that has entered the light guiding section through three or more of the holes.

(12) The remote device according to any one of (1) to (11), in which the light guiding section includes a reflecting surface, the reflecting surface being provided on a back surface of the exterior and corresponding to the predetermined region.

(13) The remote device according to any one of (1) to (12), in which the exterior has a thickness in the predetermined region which is smaller than a thickness of the exterior in a region other than the predetermined region.

(14) The remote device according to any one of (1) to (13), in which, in the predetermined region, the holes each have an aperture shape that becomes large toward a back surface of the exterior.
(15) The remote device according to any one of (1) to (14), further including a visible light cutoff filter provided between the exterior and the light receiver.
(16) The remote device according to any one of (1) to (15), in which the light receiver receives the signal light from each of a plurality of the optical remote controls that have respective signal frequency bands that are different from each other.
(17) A remote device system including:
a first remote device operable with a first optical remote control; and
a second remote device operable with a second optical remote control through an intervention of the first remote device, the second optical remote control being different from the first remote device in signal frequency band,
the first remote device including:
an exterior having a plurality of holes through which light passes, and having a structure in which a surrounding part of the holes blocks the light;
a light receiver that is disposed inside the exterior, and receives signal light of each of the first optical remote control and the second optical remote control; and
a light guiding section that is provided between the light receiver and a front surface of the exterior, and guides, to the light receiver, the signal light that has entered a predetermined region of the exterior, the predetermined region including two or more of the holes.

This application is based upon and claims the benefit of priority of Japanese Patent Application No. 2015-172265 filed with the Japan Patent Office on Sep. 1, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A remote device, comprising:
an exterior having a plurality of holes through which light passes, wherein the exterior has a structure in which a surrounding part of the plurality of holes blocks the light;
a light receiver inside the exterior, wherein the light receiver is configured to receive signal light of a plurality of optical remote controls; and
a light guiding section between the light receiver and a front surface of the exterior, wherein
the light guiding section is configured to guide, to the light receiver, the signal light that has entered a guiding region of the exterior,
the guiding region includes at least two of the plurality of holes,
the light guiding section includes a surface between the light receiver and a back surface of the exterior, and
the surface of the light guiding section has a light reflecting function and a light diffusion function.
2. The remote device according to claim 1, wherein the surface of the light guiding section further has a curved surface shape.
3. The remote device according to claim 2, wherein the surface of the light guiding section is a conical surface having surface area that decreases toward the light receiver.
4. The remote device according to claim 2, wherein the surface of the light guiding section is a paraboloidal surface having surface area that decreases toward the light receiver.
5. The remote device according to claim 2, wherein the surface of the light guiding section is an oval surface.
6. The remote device according to claim 1, wherein
the light receiver includes a first light receiving sensor and a second light receiving sensor, and
the light guiding section includes a first optical member and a second optical member,
the first optical member is configured to guide, to the first light receiving sensor, at least the signal light that has entered a first region of the guiding region, the second optical member guiding, to the second light receiving sensor, the signal light that has entered a second region of the guiding region.
7. The remote device according to claim 6, wherein
the first optical member includes a first condenser lens, and
the second optical member has an oval surface having the light reflecting function, wherein
one of the plurality of holes in the second region is at a first focal position of the oval surface, and
the second light receiving sensor is at a second focal position of the oval surface.
8. The remote device according to claim 7, wherein the second optical member includes a second condenser lens having a side surface that is the oval surface.
9. The remote device according to claim 1, wherein the light guiding section is configured to guide, to the light receiver, the signal light that has entered the light guiding section through at least three of the plurality of holes.
10. The remote device according to claim 1, wherein the light guiding section includes a reflecting surface, wherein
the reflecting surface is on the back surface of the exterior, and
the reflecting surface corresponds to the guiding region.
11. The remote device according to claim 1, wherein a first thickness of the exterior in the guiding region which is smaller than a second thickness of the exterior in a second region other than the guiding region.
12. The remote device according to claim 1, wherein, in the guiding region, each of the plurality of holes has an aperture shape that becomes large toward the back surface of the exterior.
13. The remote device according to claim 1, further comprising a visible light cutoff filter between the exterior and the light receiver.
14. The remote device according to claim 1, wherein
the light receiver is configured to receive the signal light from each of the plurality of optical remote controls that have respective signal frequency bands, and
the signal frequency bands are different from each other.
15. A remote device system, comprising:
a first remote device operable with a first optical remote control; and
a second remote device operable with a second optical remote control through an intervention of the first remote device, wherein
the second optical remote control is different from the first remote device in signal frequency band, and
the first remote device includes:
an exterior having a plurality of holes through which light passes, wherein the exterior has a structure in which a surrounding part of the plurality of holes blocks the light;

a light receiver inside the exterior, wherein the light receiver is configured to receive signal light of each of the first optical remote control and the second optical remote control; and a light guiding section between the light receiver and a front surface of the exterior, wherein the light guiding section is configured to guide, to the light receiver, the signal light that has entered a guiding region of the exterior, the guiding region includes at least two of the plurality of holes, the light guiding section includes a surface between the light receiver and a back surface of the exterior, and the surface of the light guiding section has a light reflecting function and a light diffusion function.

16. A remote device, comprising:

an exterior having a plurality of holes through which light passes, wherein the exterior has a structure in which a surrounding part of the plurality of holes blocks the light;

a light receiver inside the exterior, wherein the light receiver is configured to receive signal light of a plurality of optical remote controls; and a light guiding section between the light receiver and a front surface of the exterior, wherein the light guiding section is configured to guide, to the light receiver, the signal light that has entered a guiding region of the exterior, the guiding region includes at least two of the plurality of holes, the light guiding section includes a reflecting surface, the reflecting surface is on a back surface of the exterior, and the reflecting surface corresponds to the guiding region.

* * * * *